(12) United States Patent
Lin et al.

(10) Patent No.: US 9,388,278 B2
(45) Date of Patent: Jul. 12, 2016

(54) RELEASE LAYER, SUBSTRATE STRUCTURE, AND METHOD FOR MANUFACTURING FLEXIBLE ELECTRONIC DEVICE

(71) Applicant: INDUSTRIAL TECHNOLOGY RESEARCH INSTITUTE, Hsinchu (TW)

(72) Inventors: Chih-Cheng Lin, Zhubei (TW); Chyi-Ming Leu, Jhudong Township (TW); Yu-Ju Kuo, New Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 114 days.

(21) Appl. No.: 14/264,742

(22) Filed: Apr. 29, 2014

(65) Prior Publication Data
US 2015/0099088 A1  Apr. 9, 2015

Related U.S. Application Data

(60) Provisional application No. 61/887,033, filed on Oct. 4, 2013.

(30) Foreign Application Priority Data

Mar. 5, 2014 (TW) .............................. 103107366 A

(51) Int. Cl.
*C08G 73/10* (2006.01)
*C09D 179/08* (2006.01)
(Continued)

(52) U.S. Cl.
CPC .......... *C08G 73/1067* (2013.01); *B32B 43/006* (2013.01); *C09D 179/08* (2013.01);
(Continued)

(58) Field of Classification Search
CPC ..................................................... A44B 18/0011
USPC ............................................................ 428/99
See application file for complete search history.

(56) References Cited

U.S. PATENT DOCUMENTS 4,823,234 A   4/1989  Konishi et al.
5,638,103 A   6/1997  Obata et al.
(Continued)

FOREIGN PATENT DOCUMENTS

CN   102089858 A   6/2011
CN   103649175 A   3/2014
(Continued)

OTHER PUBLICATIONS

Korean Office Action, dated Aug. 20, 2015, for Korean Application No. 10-2014-0072261, with an English translation thereof.
(Continued)

*Primary Examiner* — Brent O'Hern
(74) *Attorney, Agent, or Firm* — Birch, Stewart, Kolasch & Birch, LLP

(57) ABSTRACT

Disclosed is a substrate structure for manufacturing a flexible electronic device, including a supporting layer, a release layer covering the supporting layer with a first area, wherein the release layer is an aromatic polyimide, and a flexible layer covering the supporting layer and the release layer with a second area. The second area is greater than the first area. The adhesion force between the flexible layer and the supporting layer is stronger than the adhesion force between the release layer and the supporting layer.

11 Claims, 5 Drawing Sheets

(51) Int. Cl.
*B32B 43/00* (2006.01)
*B32B 37/16* (2006.01)
*B32B 38/00* (2006.01)

(52) U.S. Cl.
CPC .............. *B32B 37/16* (2013.01); *B32B 38/105* (2013.01); *B32B 2379/08* (2013.01); *B32B 2457/00* (2013.01); *B32B 2457/14* (2013.01)

(56) References Cited

U.S. PATENT DOCUMENTS

| | | | |
|---|---|---|---|
| 5,728,473 | A | 3/1998 | Inoue et al. |
| 5,983,057 | A | 11/1999 | Matsuo et al. |
| 6,391,967 | B1 | 5/2002 | Hwang et al. |
| 6,493,013 | B2 | 12/2002 | Obata et al. |
| 6,673,426 | B1 | 1/2004 | Furukawa et al. |
| 6,946,536 | B2 | 9/2005 | Tashiro |
| 7,083,739 | B2 | 8/2006 | Furukawa et al. |
| 7,215,839 | B2 | 5/2007 | Kawahara et al. |
| 7,336,857 | B2 | 2/2008 | Kawahara et al. |
| 7,390,099 | B2 | 6/2008 | Takao et al. |
| 7,391,935 | B2 | 6/2008 | Kawahara et al. |
| 7,459,215 | B2 | 12/2008 | Miller et al. |
| 7,476,572 | B2 | 1/2009 | Morisue et al. |
| 7,615,288 | B2 | 11/2009 | Terada et al. |
| 7,659,360 | B2 | 2/2010 | Makinoshima et al. |
| 7,852,435 | B2 | 12/2010 | Fujisawa et al. |
| 7,871,705 | B2 | 1/2011 | Miller et al. |
| 7,935,738 | B2 | 5/2011 | Chen et al. |
| 8,173,249 | B2 | 5/2012 | Leu et al. |
| 8,182,892 | B2 | 5/2012 | Huang et al. |
| 8,273,439 | B2 | 9/2012 | Liao et al. |
| 8,477,267 | B2 | 7/2013 | Fujisawa et al. |
| 8,525,340 | B2 | 9/2013 | Eckhardt et al. |
| 2002/0005888 | A1 | 1/2002 | Obata et al. |
| 2004/0030083 | A1 | 2/2004 | Tashiro |
| 2004/0065404 | A1 | 4/2004 | Furukawa et al. |
| 2005/0064243 | A1 | 3/2005 | Moriwaki et al. |
| 2006/0028601 | A1 | 2/2006 | Kawahara et al. |
| 2006/0132922 | A1 | 6/2006 | Takao et al. |
| 2006/0153669 | A1 | 7/2006 | Miller et al. |
| 2006/0159844 | A1 | 7/2006 | Moriwaki et al. |
| 2006/0254704 | A1 | 11/2006 | Seo et al. |
| 2006/0257078 | A1 | 11/2006 | Kawahara et al. |
| 2006/0279679 | A1 | 12/2006 | Fujisawa et al. |
| 2007/0091062 | A1 | 4/2007 | French et al. |
| 2007/0126966 | A1 | 6/2007 | Takahashi |
| 2007/0177087 | A1 | 8/2007 | Kawahara et al. |
| 2007/0196962 | A1 | 8/2007 | Morisue et al. |
| 2008/0075999 | A1 | 3/2008 | Izuhara et al. |
| 2008/0132667 | A1 | 6/2008 | Makinoshima et al. |
| 2008/0176477 | A1 | 7/2008 | Hwang et al. |
| 2009/0061242 | A1 | 3/2009 | Miller et al. |
| 2010/0068483 | A1* | 3/2010 | Leu .......................... B32B 7/06 428/212 |
| 2011/0126975 | A1 | 6/2011 | Fujisawa et al. |
| 2011/0210407 | A1 | 9/2011 | Katayama et al. |
| 2012/0112347 | A1 | 5/2012 | Eckhardt et al. |
| 2012/0201961 | A1 | 8/2012 | Liao et al. |
| 2012/0213563 | A1 | 8/2012 | Qi et al. |
| 2013/0309809 | A1 | 11/2013 | Eckhardt et al. |

FOREIGN PATENT DOCUMENTS

| | | | |
|---|---|---|---|
| CN | 104379339 | A | 2/2015 |
| JP | 10-329282 | A | 12/1998 |
| JP | 2008-302569 | A | 12/2008 |
| JP | 2010-67957 | A | 3/2010 |
| JP | 2010-111853 | A | 5/2010 |
| JP | 2010-217777 | A | 9/2010 |
| JP | 2010-221523 | A | 10/2010 |
| JP | 2010221523 | A * | 10/2010 |
| JP | 2015-522451 | A | 8/2015 |
| KR | 10-2012-0100274 | A | 9/2012 |
| KR | 10-2013-0003358 | A | 1/2013 |
| TW | 314546 | | 9/1997 |
| TW | 448207 | | 8/2001 |
| TW | 201011427 | A | 3/2010 |
| TW | I354854 | | 12/2011 |
| TW | 201226444 | A1 | 7/2012 |
| TW | 201242457 | A1 | 10/2012 |
| TW | 201318123 | A1 | 5/2013 |
| TW | 201318858 | A1 | 5/2013 |
| WO | WO 2014/168404 | A1 | 10/2014 |

OTHER PUBLICATIONS

Noh et al., "Effect of Cr Thickness on Adhesion Strength of Cu/Cr/Polyimide Flexible Copper Clad Laminate Fabricated by Roll-to-Roll Process", Materials Transactions, 2010, vol. 51, No. 1, pp. 85-89
Park et al., "Cohesive failure of the Cu/polyimide system", Materials Science and Engineering A282, 2000, pp. 137-144.
Park et al., "Influence of Surface Treatment of Polyimide Film on Adhesion Enhancement between Polyimide and Metal Films", Bull. Korean Chem. Soc. 2007, vol. 28, No. 2, pp. 188-192.
Bergstresser, "The Effects of Moisture on Peel Strength of Adhesiveless Polyimide Laminates", Gould Electronics Inc., Dec. 1999.
Murray et al., "Environmental Aging and Deadhesion of Polyimide Dielectric Films", CALCE Electronic Products and Systems Center, Department of Mechanical Engineering, University of Maryland, College Park, MD, pp. 1-27, Apr. 2004.
Japanese Office Action, dated Sep. 15, 2015, for Japanese Application No. 2014-164750, with a partial English translation.
Chinese Office Action and Search Report dated Dec. 29, 2015, for Chinese Application No. 201410130994.9.
Taiwanese Office Action for corresponding Taiwanese application No. 103107366 dated Oct. 13, 2014.

\* cited by examiner

RELEASE LAYER, SUBSTRATE STRUCTURE, AND METHOD FOR MANUFACTURING FLEXIBLE ELECTRONIC DEVICE

CROSS REFERENCE TO RELATED APPLICATIONS

The application is based on, and claims priority from, Taiwan Application Serial Number 103107366, filed on Mar. 5, 2014, and claims the benefit of provisional Application No. 61/887,033, filed on Oct. 4, 2013, the disclosure of which are hereby incorporated by reference herein in their entirety

TECHNICAL FIELD

The technical field relates to a release layer, a substrate structure including the same, and a method for manufacturing the same.

BACKGROUND

Mobile communications have quickly developed, and have since 2011 been combine with content service. Likewise, flexible displays are anticipated to become a novel trend in the next generation of displays. Major IT companies are replacing thick, heavy, and easily broken glass substrates with non-glass (e.g. light-weight and flexible plastic) substrates. In addition, active full-color TFT display panels are being developed too. While flat displays are desirable in smartphones and tablets, the product's design should meet the requirements of having thin profile and light weight. Another new development is flexible/soft display technology, which may open a new age of display design. While the mass production of medium or small panels has matured, flexible displays can possibly be mass produced to be lightweight, thin, and having a larger cell space.

Fabrication processes for flexible layers are classified into batch type and roll-to-roll type. A conventional apparatus for TFT devices can be utilized to fabricate TFT devices of the batch type. However, development of substrate-transfer and film-separation techniques is required for the batch type to transfer the flexible display from glass substrates to other plastic substrates, or directly take the flexible display from the glass substrates. The roll-to-roll type needs new apparatuses, and some problems caused by rolling and contact must be overcome.

If the batch type is selected to fabricate TFT devices such as LTPS, high-temperature resistant material will be necessary due to the high process temperature (higher than 400° C.). Because the batch type may utilize the existing apparatuses for glass substrates, apparatus cost can be saved. However, to prevent the peeling of the flexible layer on the glass during the device processes, and easily take out the flexible layer (without adhering on the glass) after the device processes will be major critical points.

Accordingly, a novel substrate structure for manufacturing flexible electronic devices is called for.

SUMMARY

One embodiment of the disclosure provides a release layer, being an aromatic polyimide, and the release layer is applied to flexible electronic device processes.

One embodiment of the disclosure provides a substrate structure, comprising: a supporting layer; a release layer with a first area covering the supporting layer, wherein the release layer is an aromatic polyimide; and a flexible layer with a second area covering the release layer and the supporting layer, wherein the second area is greater than the first area, and adhesion between the flexible layer and the supporting layer is stronger than adhesion between the release layer and the supporting layer.

One embodiment of the disclosure provides a method of manufacturing a flexible electronic device, comprising: providing a supporting layer; forming a release layer with a first area to cover the supporting layer, and the release layer is an aromatic polyimide; forming a flexible layer with a second area to cover the release layer and the supporting layer, wherein the second area is greater than the first area, and adhesion between the flexible layer and the supporting layer is stronger than adhesion between the release layer and the supporting layer; forming a device on the flexible layer; and separating the supporting layer and the release layer, and the release layer and the flexible layer separated from the supporting layer have an area substantially similar to the second area.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1A:
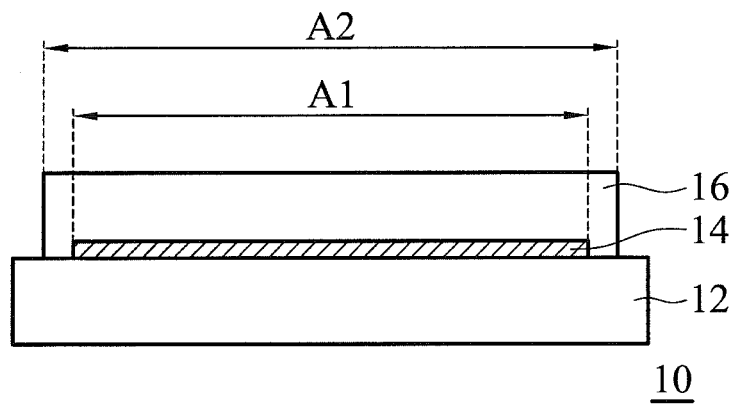
FIG. 1A shows a cross-sectional view of a substrate structure in one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The substrate structure of the disclosure may tolerate high-temperatures. A high-temperature resistant release layer material can be coated between a supporting layer and a flexible layer. The flexible layer and the supporting layer are separated by the release layer, thereby avoiding the flexible layer sticking to the glass (e.g. the flexible layer cannot be taken out in its entirety) after the back-end high-temperature processes. Accordingly, the substrate structure may enhance the process yield.

Figure 1B:
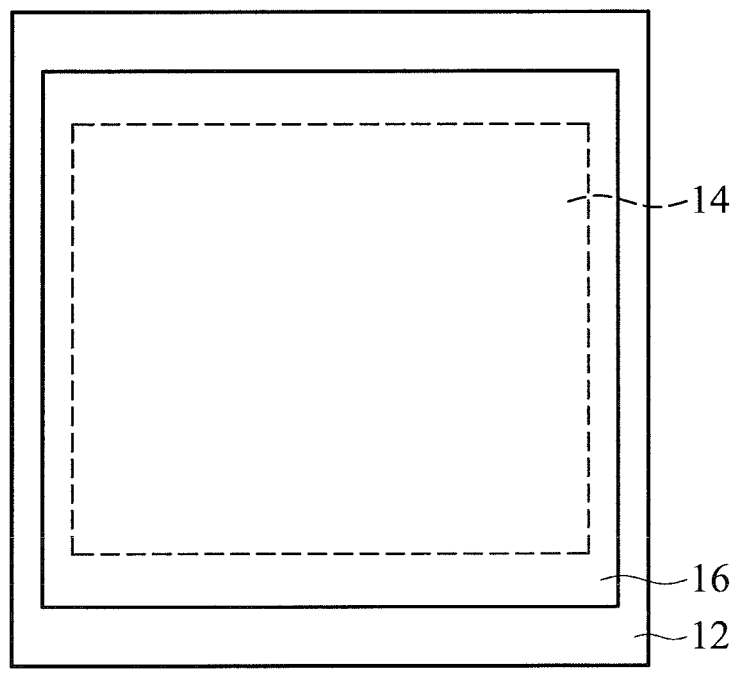
FIGS. 1B and 1C show top-views of substrate structures in embodiments of the disclosure.
Figure 1C:
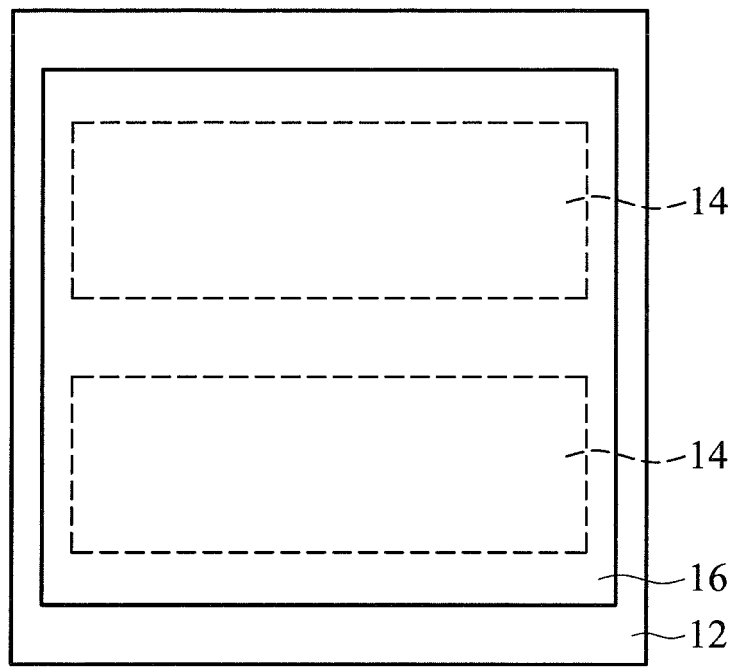

As shown in FIG. 1A, one embodiment of the disclosure provides a substrate structure 10 for flexible electronic device processes. The substrate structure 10 includes a supporting layer 12, a release layer 14, and a flexible layer 16. The supporting layer 12 may include glass or silicon wafer. The supporting layer 12 is covered by the release layer 14 of a pattern (e.g. one or more blocks as shown in FIG. 1B or 1C) with an area A1. Note that the patterns of the release layer 14 in FIGS. 1B and 1C are merely illustrated, and the shape, the size, and the configuration of the patterns of the release layer 14 can be modified by one skilled in the art if necessary. The release layer 14 is aromatic polyimide polymerized of diamine and dianhydride. The diamine can be 4,4'-oxydianiline, 3,4'-diaminodiphenyl ether, p-phenylene diamine, 2,2'-bis(trifluoromethyl)diamino benzidine, or combinations thereof. The dianhydride can be pyromellitic dianhydride, 3,3'4,4'-biphenyltetracarboxylic dianhydride, 4,4'-(hexafluoroisopropylidene)diphthalic anhydride, or combinations thereof. The diamine and the dianhydride are firstly polymerized to form polyamic acid (PAA), which is then dehydrated to form polyimide (PI), as shown in Formula 1.

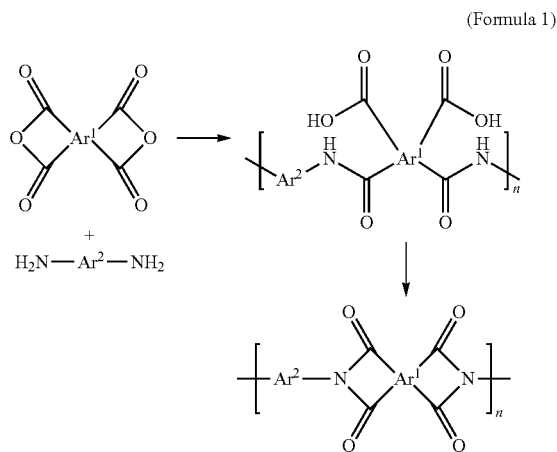

(Formula 1)

In Formula 1, the $Ar^1$ and $Ar^2$ each independently represents an aromatic group, respectively, and n is a repeating number. In practice, the diamine and the dianhydride can be initially polymerized to form polyamic acid. A polar aprotic solvent (e.g. dimethyl acetamide, DMAc) can be added to the polyamic acid solution to tune the solid content of the polyamic acid solution. The polyamic acid solution is subsequently coated on a supporting layer 12. The coating is then heated, such that the polyamic acid of the coating is reacted to form a release layer 14 of polyimide. In one embodiment of the disclosure, the release layer 14 has a thickness of 0.1 μm to 4 μm. An overly thick release layer 14 may increase the cost, wherein the film surface after baking is easily poor. An overly thin release layer 14 may be non-uniform during the coating step, such that part of the release layer 14 loses its release effect.

Subsequently, the flexible layer 16 is formed to cover the release layer 14 and the supporting layer 12, wherein the flexible layer 16 has an area A2. Note that the area A2 is greater than the area A1. In one embodiment, the flexible layer 16 and the supporting layer 12 may have adhesion of 2B to 5B therebetween (determined by an adhesion cross-cut tester), and the adhesion between the flexible layer 16 and the supporting layer 12 is stronger than adhesion between the release layer 14 and the supporting layer 12. In practice, a material solution of the flexible layer 16 can be coated on the supporting layer 12 and the release layer 14 to form a coating. The composition of the flexible layer 16 is different from the composition of the release layer 14. The flexible layer 16 can be polyimide (PI), polycarbonate (PC), polyethersulfone (PES), polyacrylate (PA), polynorbornene (PNB), polyethylene terephthalate (PET), polyetheretherketone (PEEK), polyethylene naphthalate (PEN), or polyetherimide (PEI). In one embodiment, powder such as silica, organic clay, or combinations thereof can be further added to the material solution of the flexible layer 16, thereby further increasing the adhesion between the flexible layer 16 and the supporting layer 12. For example, some aromatic polyimide is selected to be a release layer 14, and a mixture of the same aromatic polyimide and the powder may serve as the flexible layer 16. In this embodiment, the aromatic polyimide and the powder in the flexible layer 16 have a weight ratio of 1:0.11 to 1:0.43, and the powder has a size of less than 200 nm. An overly high powder ratio may reduce the flexibility of the flexible layer 16, and even crack the flexible layer 16. An overly low powder ratio may cause insufficient adhesion between the flexible layer 16 and the supporting layer 12, such that the peeling problem may occur during the high-temperature processes. An overly large powder size will make the film be opaque or highly hazy. In another embodiment, the aromatic polyimide of the release layer 14 is different from the composition of the flexible layer 16. The flexible layer 16 has a thickness of 5 μm to 40 μm. An overly thick flexible layer 16 may increase the cost. An overly thin flexible layer 16 cannot provide sufficient mechanical strength for the product.

FIGS. 2A to 2E show cross-sectional views of a flexible electronic device during processing in one embodiment of the disclosure. First, the substrate structure 10 in FIG. 1A is provided, and devices (not shown) are then formed on the flexible layer 16 of the substrate structure 10. The devices can be thin-film transistors (TFT), microelectromechanical systems (MEMS), optoelectronic conversion devices, electroluminescence devices such as organic light-emitting diode (OLED), other devices, or combinations thereof. In one embodiment, the processes for fabricating the devices are performed at a temperature of 250° C. to 450° C. Note that, if other compositions are selected to form the release layer 14, the release layer 14 may deform or crack at the process temperature for fabricating the devices.

Figure 2A:
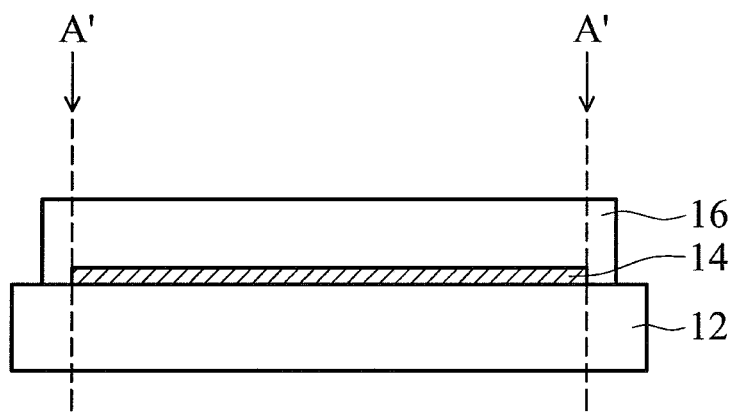
FIGS. 2A to 2E show cross-sectional views of a flexible electronic device during processing in one embodiment of the disclosure.
Figure 2B:
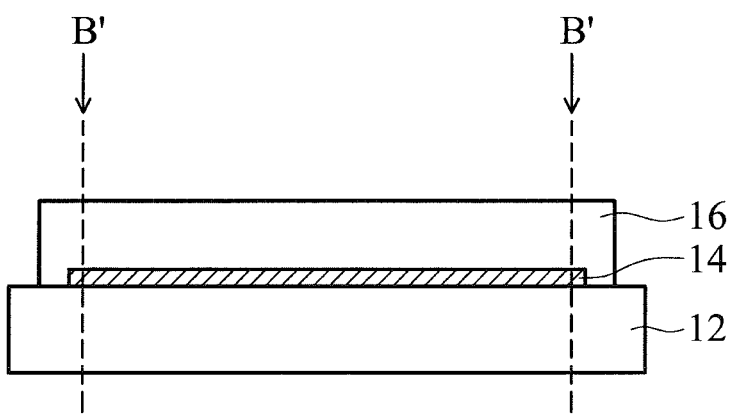
Figure 2C:
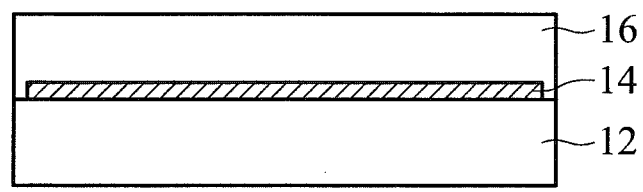

The supporting layer 12 and the release layer 14 are separated after forming the devices. In an ideal case, the separation step is performed as cutting end points (A') of the release layer 14, as shown in FIG. 2A. In a real operation, the separation step is performed as cutting an edge part of the release layer 14 overlapping the flexible layer 16 (e.g. cutting points B' in FIG. 2B) in a direction vertical to the surface of the supporting layer 12, thereby avoiding any flexible layer 16 remaining between the flexible layer 16 and the supporting layer 12 after the cutting step as shown in FIG. 2C. The flexible layer 16 and the release layer 14 separated from the supporting layer 12 have an area substantially similar to the area A2. Note that the cutting step penetrates the supporting layer 12, but it may only cuts to the surface of the supporting layer 12 without completely cutting through the supporting layer 12 in a real operation.

Figure 2D:
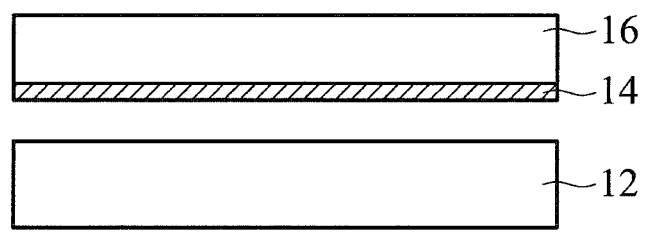
Figure 2E:
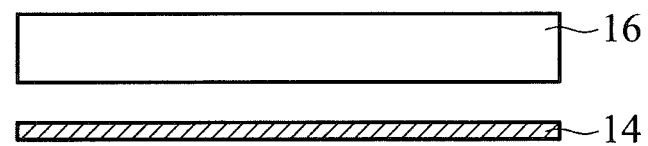

After the cutting step, only the release layer 14 is disposed between the flexible layer 16 and the supporting layer 12, and no flexible layer 16 connects to the supporting layer 12. Therefore, the release layer 14 and the supporting layer 12 can be easily separated as shown in FIG. 2D. In one embodiment, the release layer 14 and the flexible layer 16 can be separated after the above steps, as shown in FIG. 2E.

The release layer 14 may serve as a protection film for the product, and not be immediately removed after the step of separating the supporting layer 12 and the release layer 14. For example, the release layer 14 and the flexible layer 16 can be separated by a user after the product is delivered to the user. The release layer 14 can simply be peeled off the flexible layer 16. On the other hand, if the flexible layer 16 with devices formed thereon is a semi-manufacture, it can be delivered to the next processing point. The release layer 14 is then removed at the next processing point.

Below, exemplary embodiments will be described in detail with reference to accompanying drawings so as to be easily realized by a person having ordinary knowledge in the art. The inventive concept may be embodied in various forms

EXAMPLES

Example 1

Synthesis of a Polyamic Acid 16.53 g (0.153 mol) of p-phenylenediamine (PPD) was dissolved in 246.13 g of dimethylacetamide (DMAc). 45 g (0.153 mol) of 3,3',4,4'-biphenyltetracarboxylic dianhydride (BPDA) was added to the PPD solution in three batches with intervals of 30 minutes. After the BPDA was completely added into the PPD solution, the mixture was stirred and reacted at room temperature for at least 8 hours to obtain a viscous liquid, wherein the reaction was an exothermal reaction. Thereafter, 102.54 g of DMAc was added to the reaction and evenly stirred to dilute the viscous liquid. The diluted liquid had a solid content of 15% and a viscosity of 5,000 cps to 100,000 cps. The reaction is shown in Formula 2.

(Formula 2)

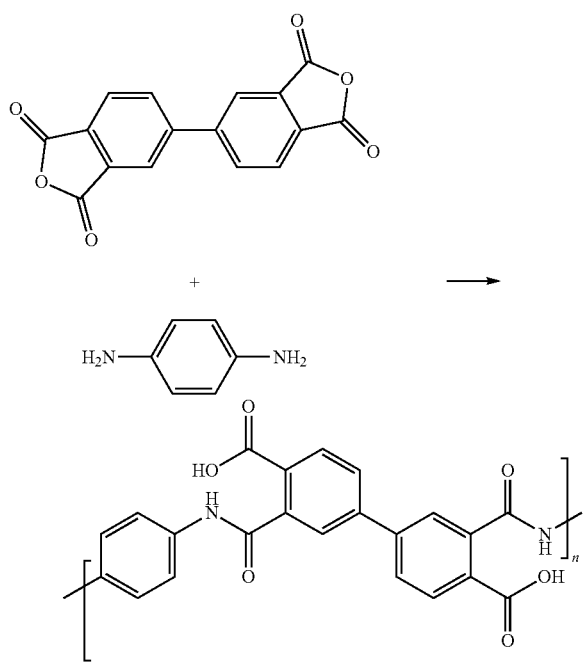

Example 2

Formation of a Release Layer 275 g of DMAc was added to 100 g of the polyamic acid solution in Example 1 and then evenly stirred, thereby obtaining a diluted polyamic acid solution with a solid content of 4%. The diluted polyamic acid solution was coated on a glass carrier to form a wet film with a thickness of 60 μm. The wet film was baked at 50° C. for half an hour, 150° C. for half an hour, 210° C. for half an hour, and 400° C. for half an hour, such that the polyamic acid of the wet film was dehydrated and cyclized to form a release layer of a polyimide (P1) on the glass carrier, as shown in Formula 3.

(Formula 3)

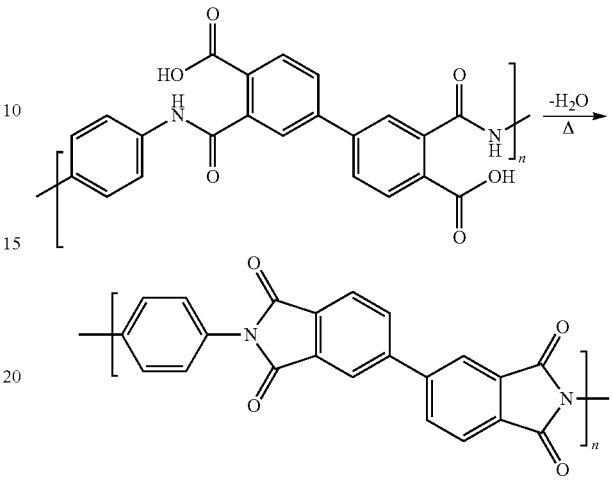

The release layer (P1) was analyzed by thermogravimetric analysis (TGA) with a heating rate of 10° C./min under atmosphere to measure its thermal degradation temperature (Td) of 614.19° C.

Example 3

Substrate Structure 30 g of the polyamic acid solution with a solid content of 15% in Example 1 and 5.63 g of 20% silica sol gel (NCT DMAc sol) were mixed by mechanical stirring to be evenly dispersed. After the complete mixing, the silica/polyamic acid dispersion was obtained for the flexible layer.

The silica/polyamic acid dispersion was then coated on the release layer and the glass carrier in Example 2 to form a wet film with a thickness of 400 μm. The wet film was baked at 50° C. for half an hour, 150° C. for half an hour, 210° C. for half an hour, 300° C. for half an hour, and 400° C. for 1 hour, such that the polyamic acid of the wet film was dehydrated and cyclized to form a flexible layer of silica/polyimide (P1+ $SiO_2$). As such, a high-temperature resistant substrate structure of the flexible layer (P1+$SiO_2$) covering the release layer (P1) and the glass carrier was finished. The edge part of the flexible layer overlapping the release layer was cut with a knife, and then peeled as a strip with a width of 2 cm to measure its release force (g) as shown in Tables 1 and 2.

Example 4

Synthesis of a Polyamic Acid 30.63 g (0.153 mol) of 4,4'-oxydianiline (ODA) was dissolved in 302.52 g of DMAc. 45 g (0.153 mol) of BPDA was added to the ODA solution in three batches with intervals of 30 minutes. After the BPDA was completely added into the ODA solution, the mixture was stirred and reacted at room temperature for at least 8 hours to obtain a viscous liquid, wherein the reaction was an exothermal reaction. Thereafter, 126.05 g of DMAc was added to the reaction and evenly stirred to dilute the viscous liquid. The diluted liquid had a solid content of 15% and a viscosity of 5,000 cps to 100,000 cps. The reaction is shown in Formula 4.

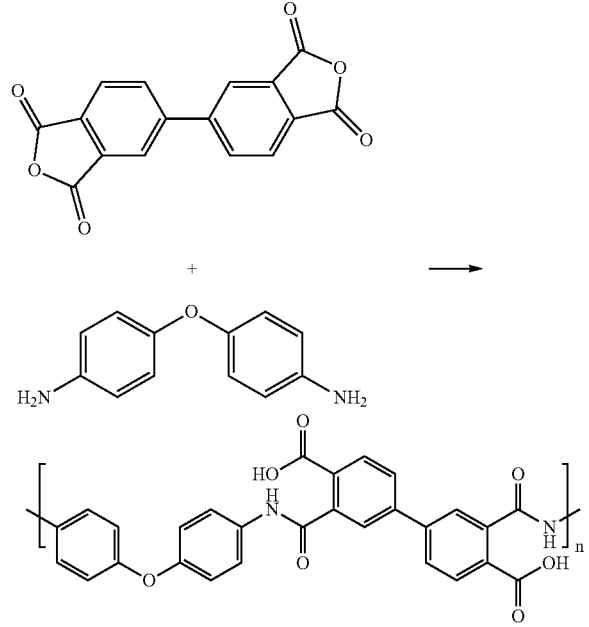

(Formula 4)

Example 5

Formation of a Release Layer 275 g of DMAc was added to 100 g of the polyamic acid solution in Example 4 and then evenly stirred, thereby obtaining a diluted polyamic acid solution with a solid content of 4%. The diluted polyamic acid solution was coated on a glass carrier to form a wet film with a thickness of 60 μm. The wet film was baked at 50° C. for half an hour, 150° C. for half an hour, 210° C. for half an hour, and 400° C. for half an hour, such that the polyamic acid of the wet film was dehydrated and cyclized to form a release layer of a polyimide (P2) on the glass carrier, as shown in Formula 5.

The release layer (P2) was analyzed by TGA with a heating rate of 10° C./min under atmosphere to measure its thermal degradation temperature (Td) of 576.67° C.

Example 6

Substrate Structure

The silica/polyamic acid dispersion prepared in Example 3 was coated on the release layer and the glass carrier in Example 5 to form a wet film with a thickness of 400 μm. The wet film was baked at 50° C. for half an hour, 150° C. for half an hour, 210° C. for half an hour, 300° C. for half an hour, and 400° C. for 1 hour, such that the polyamic acid of the wet film was dehydrated and cyclized to form a flexible layer of silica/polyimide (P1+$SiO_2$). As such, a high-temperature resistant substrate structure of the flexible layer (P1+$SiO_2$) covering the release layer (P2) and the glass carrier was finished. The edge part of the flexible layer overlapping the release layer was cut with a knife, and then peeled as a strip with a width of 2 cm to measure its release force (g) as shown in Table 1.

Example 7

Synthesis of a Polyamic Acid 16.53 g (0.153 mol) of PPD was dissolved in 236.72 g of DMAc. 35.98 g (0.122 mol) of BPDA and 6.67 g (0.03 mol) of pyromellitic dianhydride (PMDA) were added to the PPD solution in three batches with intervals of 30 minutes. After the BPDA and PMDA were completely added into the PPD solution, the mixture was stirred and reacted at room temperature for at least 8 hours to obtain a viscous liquid, wherein the reaction was an exothermal reaction. Thereafter, 98.63 g of DMAc was added to the reaction and evenly stirred to dilute the viscous liquid. The diluted liquid had a solid content of 15% and a viscosity of 5,000 cps to 100,000 cps. The reaction is shown in Formula 6.

(Formula 5)

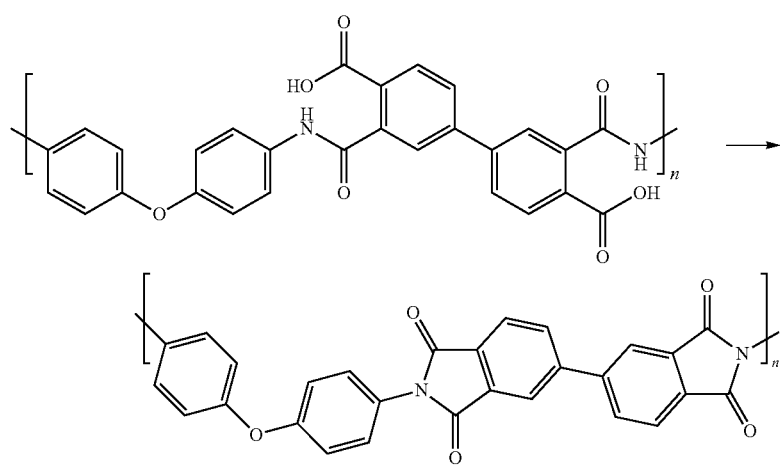

(Formula 6)

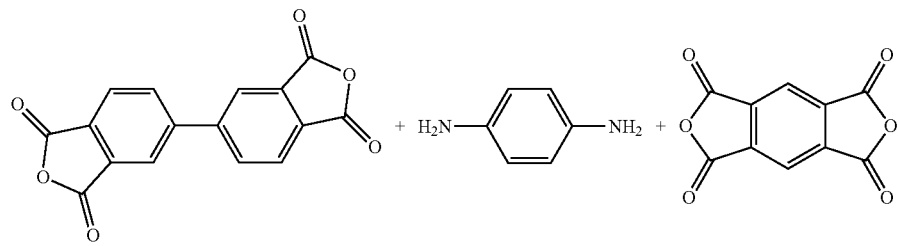

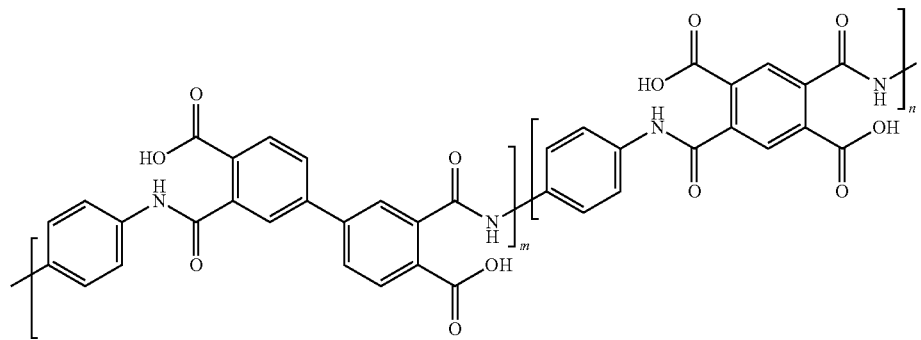

Example 8

Formation of a Release Layer 275 g of DMAc was added to 100 g of the polyamic acid solution in Example 7 and then evenly stirred, thereby obtaining a diluted polyamic acid solution with a solid content of 4%. The diluted polyamic acid solution was coated on a glass carrier to form a wet film with a thickness of 60 μm. The wet film was baked at 50° C. for half an hour, 150° C. for half an hour, 210° C. for half an hour, and 400° C. for half an hour, such that the polyamic acid of the wet film was dehydrated and cyclized to form a release layer of a polyimide (P3) on the glass carrier, as shown in Formula 7.

(Formula 7)

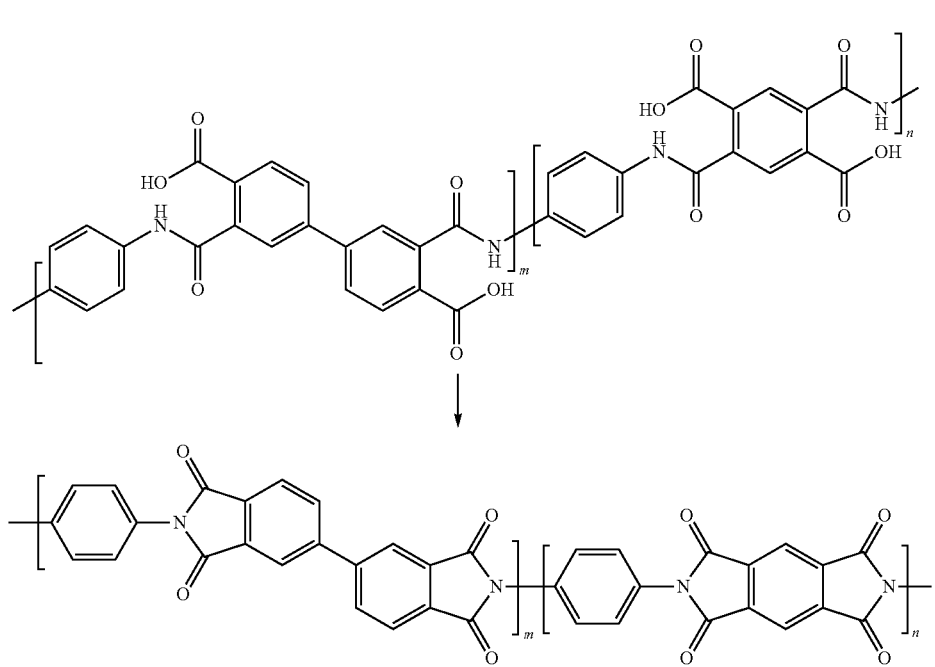

The release layer (P3) was analyzed by TGA with a heating rate of 10° C./min under atmosphere to measure its thermal degradation temperature (Td) of 601.59° C.

Example 9

Substrate Structure

The silica/polyamic acid dispersion prepared in Example 3 was coated on the release layer and the glass carrier in Example 8 to form a wet film with a thickness of 400 μm. The wet film was baked at 50° C. for half an hour, 150° C. for half an hour, 210° C. for half an hour, 300° C. for half an hour, and 400° C. for 1 hour, such that the polyamic acid of the wet film was dehydrated and cyclized to form a flexible layer of silica/polyimide (P1+SiO$_2$). As such, a high-temperature resistant substrate structure of the flexible layer (P1+SiO$_2$) covering the release layer (P3) and the glass carrier was finished. The edge part of the flexible layer overlapping the release layer was cut with a knife, and then peeled as a strip with a width of 2 cm to measure its release force (g) as shown in Table 1.

Example 10

Synthesis of a Polyamic Acid 10.81 g (0.1 mol) of PPD and 5 g (0.025 mol) of ODA were dissolved in 202.72 g of DMAc. 29.42 g (0.1 mol) of BPDA and 5.45 g (0.025 mol) of PMDA were added to the PPD and ODA solution in three batches with intervals of 30 minutes. After the BPDA and PMDA were completely added into the PPD and ODA solution, the mixture was stirred and reacted at room temperature for at least 8 hours to obtain a viscous liquid, wherein the reaction was an exothermal reaction. Thereafter, 1013.6 g of DMAc was added to the reaction and evenly stirred to dilute the viscous liquid. The diluted liquid had a solid content of 4% and a viscosity of 500 cps to 50 cps. The reaction is shown in Formula 8.

Example 11

Substrate Structure

The diluted polyamic acid solution with a solid content of 4% in Example 10 was coated on a glass carrier to form a wet film with a thickness of 60 μm. The wet film was baked at 50° C. for half an hour, 150° C. for half an hour, 210° C. for half an hour, and 400° C. for half an hour, such that the polyamic acid of the wet film was dehydrated and cyclized to form a release layer of a polyimide (P4) on the glass carrier, as shown in Formula 9.

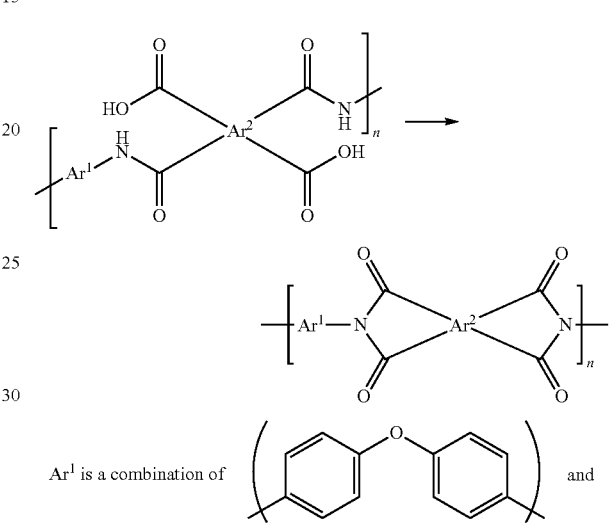

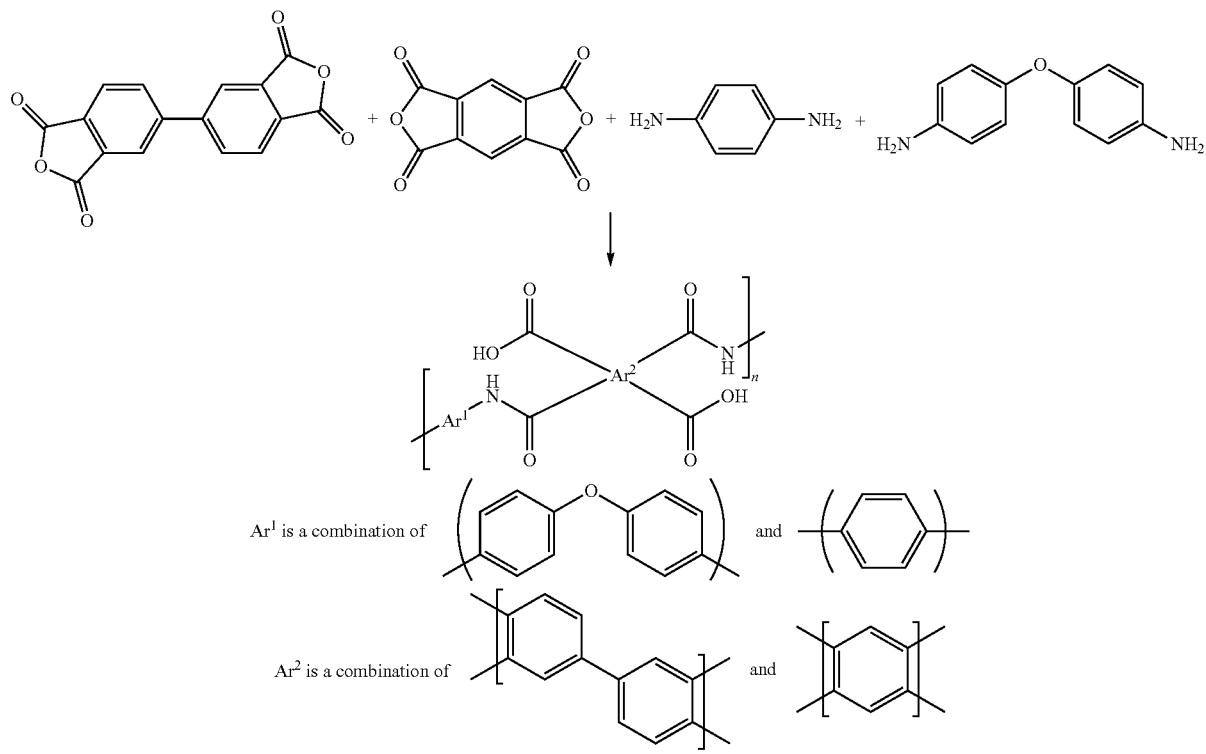

(Formula 8)

Ar² is a combination of 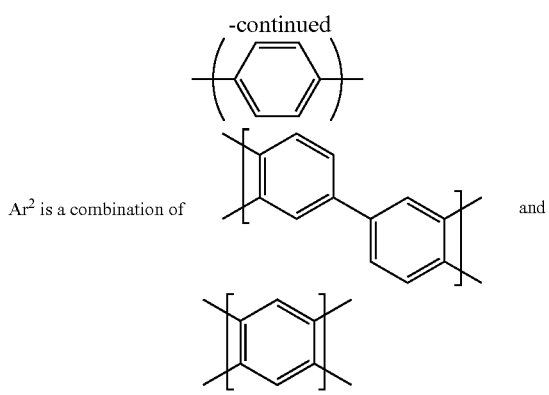 and

The release layer (P4) was analyzed by TGA with a heating rate of 10° C./min under atmosphere to measure its thermal degradation temperature (Td) of 603.62° C.

The silica/polyamic acid dispersion prepared in Example 3 was coated on the release layer and the glass carrier to form a wet film with a thickness of 400 μm. The wet film was baked at 50° C. for half an hour, 150° C. for half an hour, 210° C. for half an hour, 300° C. for half an hour, and 400° C. for 1 hour, such that the polyamic acid of the wet film was dehydrated and cyclized to form a flexible layer of silica/polyimide (P1+ $SiO_2$). As such, a high-temperature resistant substrate structure of the flexible layer (P1+$SiO_2$) covering the release layer (P4) and the glass carrier was finished. The edge part of the flexible layer overlapping the release layer was cut with a knife, and then peeled as a strip with a width of 2 cm to measure its release force (g) as shown in Table 1.

Example 12

Substrate Structure 30 g of the polyamic acid with a solid content of 15% in Example 4 and 0.18 g of tetraethoxy silane (TEOS) were mixed by mechanical stirring to be evenly dispersed. After the complete reaction, the TEOS/polyamic acid mixture solution was obtained for the flexible layer.

The TEOS/polyamic acid mixture solution was coated on the release layer (P1) and the glass carrier in Example 2 to form a wet film with a thickness of 400 μm. The wet film was baked at 50° C. for half an hour, 150° C. for half an hour, 210° C. for half an hour, 300° C. for half an hour, and 400° C. for 1 hour, such that the polyamic acid of the wet film was dehydrated and cyclized (Formula 5) to form a flexible layer of silica/polyimide (P2+TEOS $SiO_2$). As such, a high-temperature resistant substrate structure of the flexible layer (P2+ TEOS $SiO_2$) covering the release layer (P1) and the glass carrier was finished. The edge part of the flexible layer overlapping the release layer was cut with a knife, and then peeled as a strip with a width of 2 cm to measure its release force (g) as shown in Table 2.

Example 13

Substrate Structure 30 g of the polyamic acid with a solid content of 15% in Example 7 and 0.18 g of γ-glycidoxy propyl trimethoxy silane (Z-6040) were mixed by mechanical stirring to be evenly dispersed. After the complete reaction, the Z-6040/polyamic acid mixture solution was obtained for the flexible layer.

The Z-6040/polyamic acid mixture solution was coated on the release layer (P1) and the glass carrier in Example 2 to form a wet film with a thickness of 400 μm. The wet film was baked at 50° C. for half an hour, 150° C. for half an hour, 210° C. for half an hour, 300° C. for half an hour, and 400° C. for 1 hour, such that the polyamic acid of the wet film was dehydrated and cyclized (Formula 7) to form a flexible layer of silica/polyimide (P3+TEOS $SiO_2$). As such, a high-temperature resistant substrate structure of the flexible layer (P3+ TEOS $SiO_2$) covering the release layer (P1) and the glass carrier was finished. The edge part of the flexible layer overlapping the release layer was cut with a knife, and then peeled as a strip with a width of 2 cm to measure its release force (g) as shown in Table 2.

TABLE 1

| Release layers | Release force (g), and the flexible layers thereon were all the P1 + $SiO_2$ in Example 3 |
|---|---|
| P1 in Example 2 | 6~10 |
| P2 in Example 5 | 5~11 |
| P3 in Example 8 | 7~12 |
| P4 in Example 11 | 6~12 |

TABLE 2

| Flexible layers | Release force (g), and the release layers were all P1 in Example 2 |
|---|---|
| P1 + $SiO_2$ in Example 3 | 6~10 |
| P2 + TEOS $SiO_2$ in Example 12 | 8~11 |
| P3 + Z-6040 $SiO_2$ in Example 13 | 6~11 |

As shown in Tables 1 and 2, the release layers could be easily taken out by a release force of less than 15 g (width of 2 cm). As a result, the release layers P1, P2, P3, and P4 had effects, respectively. The release layer P1 worked for different substrate materials, and the release results were similar for the different substrate materials.

It will be apparent to those skilled in the art that various modifications and variations can be made to the disclosed methods and materials. It is intended that the specification and examples be considered as exemplary only, with a true scope of the disclosure being indicated by the following claims and their equivalents.

What is claimed is:
1. A substrate structure, comprising:
   a supporting layer;
   a release layer with a first area covering the supporting layer, wherein the release layer is a first aromatic polyimide; and
   a layer with a second area covering the release layer and the supporting layer, wherein the second area is greater than the first area, and an adhesion between the layer and the supporting layer is stronger than an adhesion between the release layer and the supporting layer,
   wherein the layer comprises a second aromatic polyimide and a powder mixed in the second aromatic polyimide.
2. The substrate structure as claimed in claim 1, wherein the first or second aromatic polyimide is polymerized of diamine and dianhydride, the diamine is 4,4'-oxydianiline,

3,4'-diaminodiphenyl ether, p-phenylene diamine, 2,2'-bis (trifluoromethyl)diamino benzidine, or combinations thereof, and the dianhydride is pyromellitic dianhydride, 3,3'4,4'-biphenyltetracarboxylic dianhydride, 4,4'-(hexafluoroisopropylidene)diphthalic anhydride, or combinations thereof.

3. The substrate structure as claimed in claim 1, wherein the supporting layer comprises glass carrier or silicon wafer.

4. The substrate as claimed in claim 1, wherein the first aromatic polyimide and the second aromatic polyimide are different.

5. The substrate structure as claimed in claim 1, further comprising a device formed on the layer.

6. The substrate structure as claimed in claim 1, wherein the first aromatic polyimide and the second aromatic polyimide are the same.

7. A method of manufacturing a flexible electronic device, comprising:
providing a supporting layer;
forming a release layer with a first area to cover the supporting layer, and the release layer is a first aromatic polyimide;
forming a layer with a second area to cover the release layer and the supporting layer, wherein the second area is greater than the first area, and an adhesion between the layer and the supporting layer is stronger than an adhesion between the release layer and the supporting layer;
forming a device on the layer; and
separating the supporting layer and the release layer, and the release layer and the layer separated from the supporting layer have an area substantially similar to the second area,
wherein the layer comprises a second aromatic polyimide and a powder mixed in the second aromatic polyimide.

8. The method as claimed in claim 7, wherein the first or second aromatic polyimide is polymerized of diamine and dianhydride, the diamine is 4,4'-oxydianiline, 3,4'-diaminodiphenyl ether, p-phenylene diamine, 2,2'-bis(triflroromethyl)diamino benzidine, or combinations thereof, and the dianhydride is pyromellitic dianhydride, 3,3'4,4'-biphenyltetracarboxylic dianhydride, 4,4'-(hexafluoroisopropylidene) diphthalic anhydride, or combinations thereof.

9. The method as claimed in claim 7, wherein the step of forming the device on the layer is performed at a temperature between 250° C. to 450° C.

10. The method as claimed in claim 7, wherein the step of separating the supporting layer and the release layer comprises:
cutting an edge part of the release layer overlapping the layer in a direction vertical to a surface of the supporting layer.

11. The method as claimed in claim 7, further comprising a step of separating the layer and the release layer after the step of separating the supporting layer and the release layer.

* * * * *